United States Patent [19]
Deckard et al.

[11] Patent Number: 5,510,763
[45] Date of Patent: Apr. 23, 1996

[54] REAR TRUCK STROBE LIGHT CONTROLLER FOR BACKING OR PARKING

[75] Inventors: Norman Deckard, Cooper City, Fla.; Thomas Schupbach, Arvada, Colo.

[73] Assignee: Ryder Truck Rental, Inc., Miami, Fla.

[21] Appl. No.: 71,080

[22] Filed: Jun. 2, 1993

[51] Int. Cl.⁶ .................................................. B60Q 1/26
[52] U.S. Cl. ........................ 340/431; 340/472; 340/463; 340/471
[58] Field of Search .................... 340/431, 425.5, 340/463, 469, 471, 472, 468, 464; 362/61

[56] References Cited

U.S. PATENT DOCUMENTS

| | | | |
|---|---|---|---|
| 3,916,377 | 10/1975 | Demeter | 340/472 X |
| 4,096,469 | 6/1978 | Hollins | 340/471 |
| 4,127,844 | 11/1978 | Purdy | 340/475 x |
| 4,550,305 | 10/1985 | Bookbinder | 340/479 |
| 5,073,768 | 12/1991 | Willaredt | 340/475 |

*Primary Examiner*—Victor R. Kostak
*Assistant Examiner*—Nathan J. Flynn
*Attorney, Agent, or Firm*—Laff, Whitesel, Conte & Saret, Ltd.

[57] ABSTRACT

A controller for a strobe light on the back of the truck causes the light to flash whenever the truck's transmission is either in reverse or in park, and is contingent upon operation of hazard lights. The strobe light is placed in a location on the back of the truck where other lights are not normally found, such as on a centerline of the back panel of the truck, and approximately 40-inches off the ground. The strobe light has approximately half the brightness of a stop light and about one-third the brightness of turn signals, but it is attention getting because the light has a very sharp pulse form. The lens of the strobe light is amber, which matches the color of a caution light on most stop and go traffic lights and on the flashing direction signals. A control circuit for the strobe light includes a pair of switches which are operated responsive to a lighting of the clearance lights and a shifting of a transmission into either a park or a neutral position, respectively, for lighting the strobe light. The control circuit also flashes the strobe light if the transmission is shifted into reverse. The four-way hazard light switch is a master control for enabling the strobe light.

12 Claims, 2 Drawing Sheets

REAR TRUCK STROBE LIGHT CONTROLLER FOR BACKING OR PARKING

This invention relates to lights for the rear end of trucks and more particularly to a controller for lights for issuing warnings that the truck is either backing or parked.

Rear end collisions are a constant hazard for the trucking industries. Usually, a motorist who is overtaking or approaching the rear of a truck may be expecting the truck to be moving forward. If the truck is moving forward at that time, the motorist has not only the space between his auto and the truck but also the distance which the truck travels before the auto comes to a stop. However, if the truck is backing, the distance available for the oncoming motorist to stop his car is reduced by the distance over which the truck moves backwardly during the motorist's reaction time. Furthermore, if the truck is parked there is an intermediate condition where the motorist has the distance provided by only his own reaction time, with nothing added or subtracted by truck movement. This means that when the oncoming motorist first learns that the truck is backing or parked, he slams on his brakes.

Obviously therefore, it is desirable to warn the oncoming motorist as soon as possible that he is overtaking either a backing or a stopped truck. However, this is not necessarily an easy thing to do since there already are many lights on the back of a truck, such as tail lights, stop lights, turn signals, clearance lights, and the like. The stop or backing warning lights must not conflict with the other lights which signal other events. Also, the warning lights should not be so attention-getting that they needlessly attract the attention of, or startle, other motorists who may be driving past the truck. In traffic, these other motorists could inadvertently do something dangerous to cause an accident. Also, there is a tendency for motorists to slow and look at anything unusual, thereby creating a gapers block in traffic.

There are a number of safe driving practices that any truck driver with enough experience to drive a semitrailer, or the like, will almost certainly follow. One practice required by the Federal Motor Carrier Safety Regulations is to switch on the "four-way" hazard lights under specified conditions. It is not the normal safe driving practice to switch on the hazard lights when the truck is stalled in heavy traffic. But, existing safety regulations require directional signals to blink simultaneously when a truck is stopped upon the traveled portion of a highway or the shoulder for any cause other than necessary travel stops. The same rules may be used to determine when an improved warning light system should be flashed.

The operation of the strobe depends jointly upon the switching on of the clearance lights and the hazard lights. The clearance lights are used to control an application of a signal since there are many times when the truck may be parked with its headlights off, its engine shut down, and its clearance lights on. If the truck is either parked in a public place or operated at night, the clearance lights are always switched on. Therefore, the headlight switch or ignition key should not be used for enabling the circuit. The Federal Motor Carrier Safety Regulations, Subpart C, §392.20(a), says that the hazard lights must be flashing whenever the truck is stopped, parked, or left standing on a traveled portion of a highway or a portion thereof. Also, it is a normal safety practice to have the hazard lights on whenever a truck is being backed or loaded or unloaded at a location where other traffic is possible.

Yet another consideration for improving the warning lights is to have the warning lights fit into the existing scheme of truck and other traffic lighting. Thus, it would be advantageous if the information conveyed by the warning light fits into the motorist's pre-existing understanding and expectations. For example, red lights are used for stop lights, tail lights, and other danger signals; amber lights are used for turn signals and other warning lights.

In general, the red lights create a sense in the person viewing them that he must take some immediate action. The amber or yellow lights generally imply that information is being conveyed. This is in conformity with other information-giving uses of amber lights which may mean such things as a green traffic light is about to turn red, a barrier is in front of a hole in the pavement, a traffic light is some distance down the road, the vehicle is about to turn, or the like. Thus, an amber or yellow light alerts a motorist that he may be required to take some action.

The red stop and tail lights usually have a brightness up to 300 candela, while the amber turn signal light may have a brightness up to 750 candela. These illumination levels are generally approved or set by some regulating governmental agency, such as the U.S. Department of Transportation, for example. The inventive, amber warning light should have approximately 165 candela of brightness so as to be easily seen by the pertinent motorists without distracting other motorists.

These same governmental agencies already have various rules and regulations on the use of lights to warn oncoming motorists that a truck is stopped or backing. However, these existing warning lights have burned steadily and have sometimes been confused with other lights on the back of a truck. As a result, there have been many rear end collisions despite the warning light that have been used in the past. Nevertheless, the existing rules and regulations are known to many motorists. Therefore, any new lighting should be compatible with the existing rules and regulations.

Accordingly, an object of the invention is to provide a new and improved controller for warning lights, especially for the rear ends of trucks, although equally adaptable to other motor vehicles. Here, an object is to provide an attention getting warning light, although not one which is so attention getting that it distracts other motorists. In this connection, an object is to provide a warning light which fits into known color schemes and lighting techniques, so that a motorist seeing it for the first time will, nevertheless, be likely to relate to the message being sent by the warning light.

Another object is to give a light signal on the back of a truck which is parked or is backing. Here an object is to issue the light signal automatically so that no human error, such as failing to flip a light switch, would defeat the warning light system. In particular, an object is to give a flashing amber light, which is distinctive, and especially a strobe light with a sharp pulse of amber light.

In keeping with an aspect of the invention, these and other objects are accomplished by providing a controller for a strobe light on the back of the truck, to be flashed whenever the truck's transmission is either in reverse or in park, and contingent upon hazard lighting conditions. The strobe light is placed in a location on the back of the truck where lights with other messages are not normally found, such as on a centerline of the back panel of the truck, and approximately 40-inches off the ground. The strobe light has approximately half the brightness of a stop light and about one-third the brightness of turn signals, but it is attention getting because the light has a very sharp pulse form. The lens of the strobe light is amber, which matches the color of a caution light on most stop and go traffic lights and on the flashing direction signals. Hence, an amber light implies information rather than the emergency action demanded by a red light.

The invention will be best understood from a study of the attached drawings, taken in connection with the accompanying specification, in which.

Figure 1:
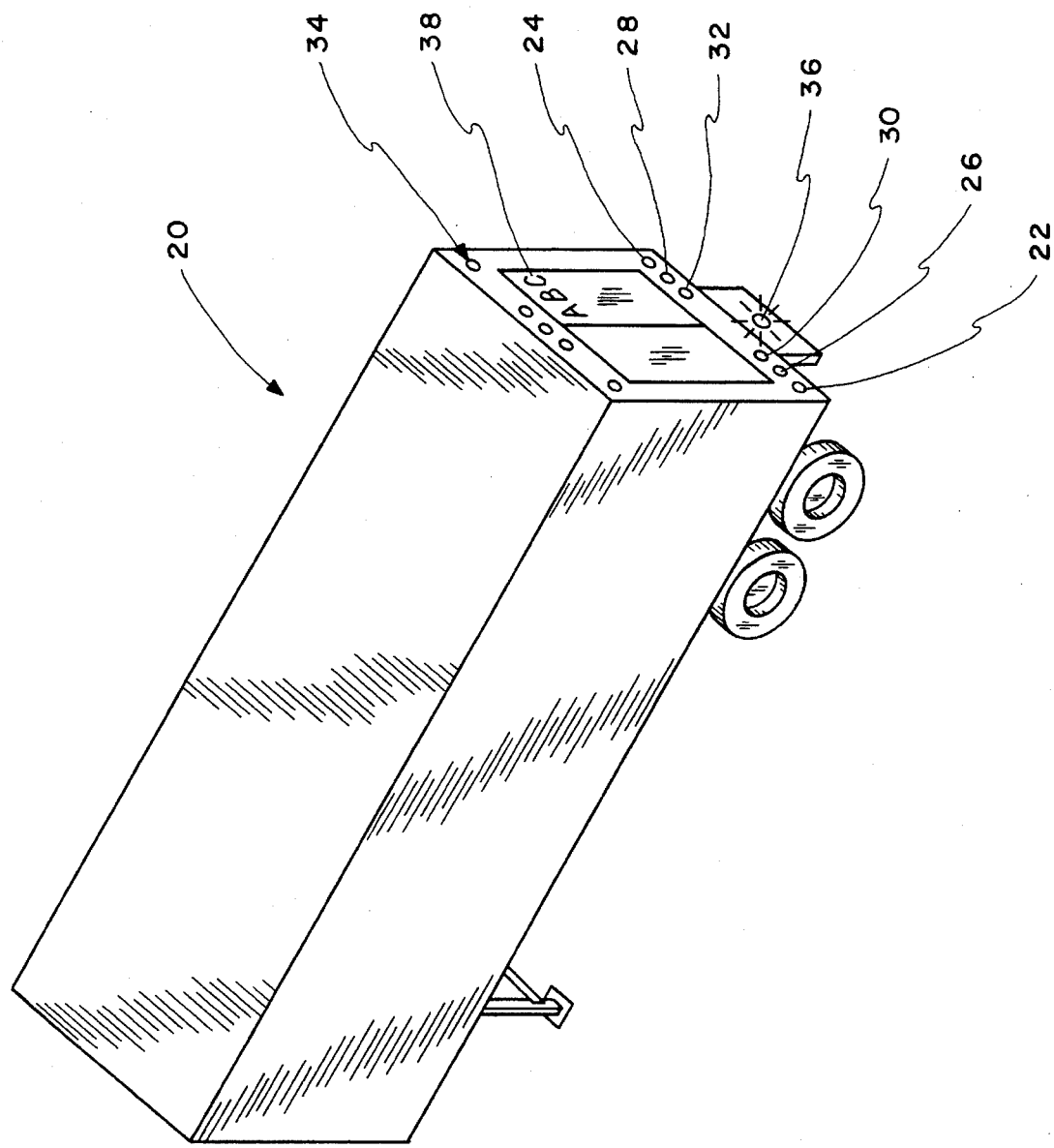
FIG. 1 is the trailer of a semitrailer truck.

FIG. 1 shows a trailer 20 which is part of a semitrailer truck. A number of lights on the rear end of trailer 20 are prescribed by various safety agencies. These lights include red tail lights 22, 24 which are "on" whenever the truck's headlights are turned on. Red stoplights 26, 28 light whenever the brakes are applied. Amber directional turn signals 30, 32 are operated by the driver of the truck and canceled by a steering wheel returning to a straight drive position. In addition, most large trucks have clearance or boundary lights 34 which tend to show the height and width of the truck. The clearance or boundary lights are predominantly red, although sometimes they may be a mix of red and amber.

The invention places the warning strobe light 36 on the center line of the panel at the back of the truck and within the height span of 36-to-80 inches above the ground, measured with the vehicle unloaded. This height span accommodates different types of trucks. Forty inches is the preferred height for all trucks, where practical.

The warning light is an amber strobe light which flashes repeatedly, with a relatively sharp pulse of light. The flash rate preferably should not exceed 80 flashes per minute. Among other conditions, the flashing strobe light 36 should be spaced well away from any advertising 38 that may appear on the back of the truck, since motorists often say that the rear end collisions occur because they were distracted by the advertisements.

Figure 2:
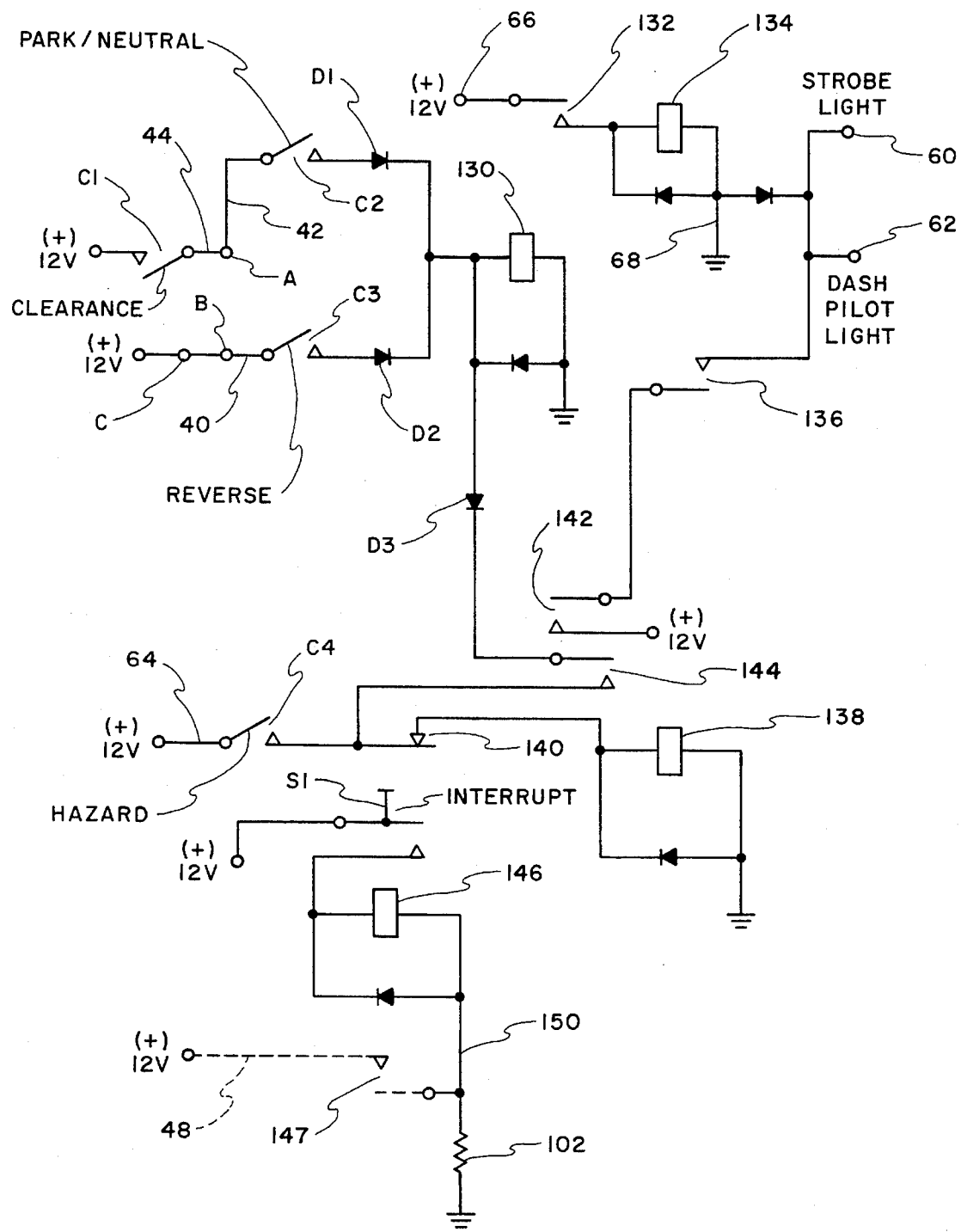
FIG. 2 shows the strobe light control circuit.

The schematic circuit diagram for the inventive strobe light control is seen in FIG. 2. The inputs to the circuit include wires 40, 42 which are energized by an operation of the transmission. In particular, wire 40 is an existing wire for back-up lights which is energized when the transmission is in reverse. When the gears are shifted into or out of reverse, the signal is applied to or removed from wire 40. Wire 42 is new, is installed in the transmission, and is energized when the transmission is in either park or neutral. Wire 44 is energized when the driver operates a switch C1 to switch on the clearance lights of the truck.

Wire 48 carries an override or interrupt signal that may be energized by the driver in order to cancel the inventive strobe lighting. For example, if the truck is in very heavy traffic, the circuit might "think" that it is parked. Then, strobe lights would be flashing in the eyes of the next following motorist. Preferably the energization of this wire is self-cancelling so that it automatically disappears and requires no driver initiative when the truck is restarted, gears are shifted, moved, or the like.

The outputs include wire 60 which is intermittently energized to flash the strobe light. A wire 62 leads to a dashboard pilot light which informs the driver of the flashing strobe. Wire 64 is an input from the hazard light control, which simultaneously flashes all four direction signal lamps. Governmental regulations require the hazard lights to be "on" under all conditions when the inventive lights should be flashing. Therefore, the hazard lamp wire 64 may function as a master control. The vehicle battery is connected directly to the circuit at points marked "12 V."

FIG. 2 shows an all relay circuit which controls the strobe light. All of the diodes connected across a relay winding in FIG. 2 are provided to prevent a voltage spike which may result from the back EMF that might occur when the magnetic field of the relay coil collapses upon deenergization.

There are three conditions during which the strobe light must flash: the truck must be in reverse, park, or neutral; the clearance lights must be on; and the hazard lights must be turned on. However, if the truck is placed in reverse, the strobe light should be flashed without regard as to whether it is day or night. Therefore, there is no need to provide enabling signals, such as the clearance lights being switched on. On the other hand, it is a safe driving practice to put the hazard lights on whenever a truck is being backed. If the decision is to connect the strobe light to flash any time that the truck is in reverse regardless of whether it is day or night, terminals B and C are interconnected, as shown in FIG. 2. On the other hand, if the decision is to connect the strobe light so that it will flash only if the truck is in reverse and if it is night time, terminals B and C will be disconnected and terminals A and B will be connected.

Contacts C1 close when the clearance lights are turned on. Contacts C2 close when the transmission is shifted into park or neutral. Contacts C3 close when the transmission is shifted into reverse. Contacts C4 close when the hazard lights are turned on. The interrupt switch S1 is a manually operated push button on the dashboard which is spring biased to an open contact position, except when it is held in a closed position by an energized winding 146.

When the truck clearance lights are switched on and when the transmission is either in reverse or park/neutral, a circuit is completed from (+)12 v through contacts C1, C2 or C3 (if terminals A and B are interconnected), an isolation diode D1 or D2, and the winding 130 to ground. If terminals B and C are interconnected. (as shown), relay 130 operates when the transmission is in reverse and without regard to whether the clearance lights are off or on. Relay 130 operates and contacts 132 close to operate relay 134. Relay 134 closes contacts 136.

If the hazard lights are on, contacts C4 are closed to operate relay 138 via contact 140. Contacts 142 close when relay 138 operates, in order to light the strobe light 60 and dashboard pilot light 62 via contacts 142, 136.

Relay 138 locks operated over a circuit traced through contacts 140, 144, diodes D3, D1 or D2, contacts C2 or C3 (depending on whether the transmission is in reverse or park/neutral), and contacts C1 (or terminals B, C) to the (+)12 v potential.

If the driver wants to prevent the strobe from flashing, as when he is standing in stalled traffic, he momentarily pushes a spring biased interrupt switch S1 and energizes winding 146, which holds switch S1 operated. To make the circuit free from human error, switch S1 is spring biased to open when winding 146 is de-energized. Relay 146 operates and locks itself as it operates and holds switch S1 in a closed position against its spring bias. When relay 146 operates, contacts 147 close to prepare a release circuit, without present effect. Contacts 140 open to release relay 138, if it is operated. Then, contacts 142 are opened, and neither the strobe light 60 nor the dash pilot light can light.

Wire 48 is energized when almost anything happens to the truck (shift out of park, neutral, reverse; turn off clearance or hazard lights, etc.). A (+)12 v potential is applied via wire 48 to wire 150 and the winding of relay 146 is shunted to cause it to release because (+)12 v is applied to each side of its winding. As soon as the relay 146 is shunted and released, contacts 147 will open so there will not be a constant current drain through a resistor 102 associated with relay 146. The manual interrupt switch S1 opens responsive to its own spring bias.

The release of the circuit occurs when the various contacts C1–C4 open, upon a switching off of the clearance or hazard lights, or shifting of gears. The contacts C1–C3 open to release relay 130. If the truck transmission is shifted out of park/neutral or reverse, contacts C2 or C3 open to release relay 130. When relay 130 releases, contacts 132 open to release relay 134. Then contacts 136 open so that the strobe light and dashboard pilot light cannot be lit.

If the hazard light is switched off contacts C4 open to prepare for a release of relay 138. If the clearance lights are switched off to open contacts C1, or if the transmission is shifted out of park/neutral or reverse to open contacts C2 or C3, respectfully, relay 138 releases with results as described above.

The circuit has now released and returned to normal.

Those who are skilled in the art will readily perceive how to modify the invention. Therefore, the appended claims are to be construed to cover all equivalent structures which fall within the true scope and spirit of the invention.

The claimed invention is:

1. A strobe light device for a rear end of a truck, said truck having head lights, tail lights, clearance lights, hazard lights, sad strobe light device, and a transmission, said strobe light device comprising: a strobe light, means responsive to a driver operating the truck in a normal safe driving manner for automatically enabling said strobe light, means responsive to an operation of said transmission of said truck into park, neutral, or reverse positions while said strobe light is enabled or flashing said strobe light, means for manually overriding said strobe light in order to prevent said flashing of said strobe light, and means responsive to a change in truck operation for automatically canceling said manual override.

2. A strobe light device for a rear end of a truck, said device comprising a strobe light, means responsive to a driver following normal safe driving practices for enabling said strobe light, means responsive to an operation of a vehicular transmission into park, neutral, or reverse positions while said strobe light is enabled for flashing said strobe light, and means for manually overriding said strobe light in order to prevent said flashing of said strobe light, said means for manually overriding being a self cancelling switch which is released response to a change in velocity of said truck.

3. A strobe light device for a rear end of a truck, said device comprising a strobe light, means responsive to a driver following normal safe driving practices for enabling said strobe light, said safe driving practices relating to and consisting of back up lights lit responsive to a lighting of clearance lights on trucks parked on road ways and a lighting of hazard lights under prescribed conditions, said means being jointly responsive to an operation of a truck in said safe driving practices and to a hazard lamp control, and means responsive to an operation of a vehicular transmission into park, neutral, or reverse while said strobe light is enabled for flashing said strobe light.

4. A control circuit for a strobe light mounted on a rear end of a vehicle, said control circuit including a pair of switches, means responsive to lighting clearance lights for closing one of said pair of switches, means responsive to shifting a transmission of said vehicle in either a park or a neutral position for closing the other of said pair of switches, a hazard light switch, and means responsive to a simultaneous operation of both of said pair of switches and said hazard light switch for flashing a strobe light mounted on the rear of said vehicle.

5. The circuit of claim 4 and a relay having a winding energized when both of said pair of switches are operated simultaneously, and contact means closed responsive to said energization of said winding for applying a power source to activate said strobe light.

6. The circuit of claim 3 and a third switch means responsive to shifting said transmission of said vehicle into reverse for energizing said winding independently of said pair of switches.

7. The device of claim 4 and manual override means independent of said hazard light switch for independently interrupting and inhibiting operation of said strobe light.

8. The device of one of the claims 2 or 7 wherein said manual override means is a spring biased switch having a holding coil for holding said override means in an override position when said coil is energized, and means for de-energizing said coil to release said override means, said de-energizing means being a release of said spring biased switch in response to a driver of said truck or vehicle operating his truck or vehicle.

9. The device of one of the claims 1 or 4 and means for displaying said strobe light at the vertical center line of the rear of the truck or vehicle and in the range of 36–80 inches above the ground.

10. The device of one of the claims 1 or 4 wherein said strobe light flashes at a rate less than 80 flashes per minute.

11. The device of one of the claims 1 or 4 and means wherein said strobe light is an amber light having a brightness of approximately 165 candela.

12. The device of one of the claims 1 or 4 and means responsive to an operation of a hazard light control for providing a master control switch controlling said strobe light.

* * * * *